United States Patent
Askman et al.

(10) Patent No.: US 7,357,162 B2
(45) Date of Patent: Apr. 15, 2008

(54) METERING DEVICE

(75) Inventors: Lars Askman, Aurora, OH (US); Richard E. Ludwick, Twinsburg, OH (US)

(73) Assignee: Nestec S.A., Vevey (CH)

(*) Notice: Subject to any disclaimer, the term of this patent is extended or adjusted under 35 U.S.C. 154(b) by 168 days.

(21) Appl. No.: 10/532,266

(22) PCT Filed: Oct. 22, 2003

(86) PCT No.: PCT/EP03/11703

§ 371 (c)(1), (2), (4) Date: Apr. 22, 2005

(87) PCT Pub. No.: WO2004/038345

PCT Pub. Date: May 6, 2004

(65) Prior Publication Data

US 2006/0048847 A1    Mar. 9, 2006

(51) Int. Cl.
*B65B 1/04* (2006.01)

(52) U.S. Cl. .............. 141/248; 141/238; 141/241; 222/219

(58) Field of Classification Search ........ 141/237–239, 141/241–245, 248; 222/219, 273
See application file for complete search history.

(56) References Cited

U.S. PATENT DOCUMENTS

| | | | | |
|---|---|---|---|---|
| 2,427,680 A | * | 9/1947 | Leonard ............... | 184/7.4 |
| 3,329,319 A | * | 7/1967 | Isaac .................. | 222/219 |
| 3,400,739 A | | 9/1968 | Dardaine et al. | |
| 3,459,338 A | * | 8/1969 | Dixon et al. ........ | 222/219 |
| 4,503,995 A | * | 3/1985 | Anderson ............ | 222/219 |
| 4,830,068 A | | 5/1989 | Langenhahn et al. | |
| 5,456,298 A | | 10/1995 | Tennis | |
| 6,409,051 B1 | * | 6/2002 | Travis ................ | 222/219 |

\* cited by examiner

*Primary Examiner*—Timothy L. Maust
(74) *Attorney, Agent, or Firm*—Bell, Boyd & Lloyd LLP

(57) ABSTRACT

A device for accurately metering food. The device includes an outer part and an inner metering part having a dosing chamber and a piston block slideably mounted therein. The housing outer part has three passageways, and the dosing chamber is configured, dimensioned, and positioned to alternately connect two of the three passageways of the outer part. The inner metering part is configured, dimensioned and positioned for rotation within the outer part. The outer housing part and the inner metering part are mounted concentrically with the inner metering part and the inner metering part has only one degree of liberty in rotation around a central axis of rotation.

13 Claims, 5 Drawing Sheets

METERING DEVICE

FIELD OF THE INVENTION

This invention relates to an apparatus for metering and dispensing precise portions of fluid food products like sauce, paste, and cream. More precisely, the present invention relates to a slide piston metering device for performing this function.

BACKGROUND OF THE INVENTION

Existing apparatus and machines for dispensing such fluid food products in the mass production industry are generally coupled to a product supply assembly which pressurizes the fluid product at an inlet of the metering device. This enables the device to dispense an appropriate amount of food product at its outlet and onto a conveyor belt or in a tray or pouch for filling it with product. The product supply assembly can for instance include a product container such as a hopper or a canister and a pump, which continuously or alternately extracts the food product from the product container and supplies it to the metering and dispensing device under a pressure level that depends on product viscosity, the amount to be dispensed, and the expected production rate of the line.

Many food products require an accurately measured amount of a filling to be inserted into pouches and trays or as ingredients in the preparation of meals and cakes of every sorts. Previously this has been done by hand which is extremely expensive and time consuming. However, it is necessary that the amount of dispensed food product remains constant and accurate. Indeed, when the receiving medium is over-filled or covered, the manufacturer would have product loss and increased production and raw material costs. To the contrary, when the receiving medium is not provided with sufficient product, the recipe would not meet the customers' expectations.

Several devices and apparatuses have already been developed for accurately metering and dispensing fluid food products. U.S. Pat. No. 5,850,946 relates to a metering device featuring a rotatable metering element in the form of a ball with at least one transverse bore containing a shuttling ball acting as a piston, which can be used for metering gases, liquids and solid particles. The metering element is coupled to a drive shaft and held captive in a casing having opposite passages for inlet and outlet flow of the metered product. In operation, a fluid to be metered is supplied via inlet port and acts on the shuttling ball in the rotating element so that it traverses the rotating element from an extremity to the other, thus dosing a volumetric shot of fluid and expelling an equal volume of fluid via outlet port to a dispensing device. Then, a rotation of 180° of the rotating element is achieved thanks to the drive shaft, and the shuttling ball is again pushed down the bore, dosing a second volumetric shot and expelling the first shot dosed. This is repeated as necessary for dispensing additional dosages or amounts of product.

Such a metering device has an advantage in that it allows for very quick and accurate metering of fluids. However it also constitutes a complicated assembly of many distinct elements which makes it difficult to maintain in case of problems. Furthermore, only very small amounts of fluid product can be dosed and expelled in each working cycle of the device. This does not make such a metering device suitable for food fluid product metering and dispensing in a high quantity food production line. Due to its small capacity, such a metering device is further not suitable for metering semi-fluidic products having food particles therein, such as fruits or meat particles in pies, cream or yogurt, as the device would rapidly be clogged with food in operation. Finally, it is not possible to dose and dispense more than one type of fluid product with the same metering device to increase the production rate of the line.

A possibility to dispense several portions of product with a single machine is disclosed in U.S. Pat. No. 2,551,419, which describes a filling machine for bakery products. A piston provides a pressure on the filling material that is dispersed through a manifold, while a series of valve-controlled ports then releases the product onto a conveyer belt. One shortcoming of this device is that is does not provide for accurate metering of the food product. Another filling device with more than one outlet port is shown in U.S. Pat. No. 4,830,068. This filling machine is capable of simultaneously filling recipients on two separate production lines running in parallel. Dosing and dispensing of the product is achieved by means of a dosing piston and a rotating valve, which aims at regulating the flow of product pressurized by the piston to parallel outlets for dispensing. A major drawback of the device disclosed in U.S. Pat. No. 4,830,068 is that a precise and controlled metering of the product to be dispensed cannot be achieved, and the relatively large size of the machine makes it difficult to implement in a mass production line.

Metering systems based on a slide piston are already known in the art, as for example from U.S. Pat. No. 5,456,298. This patent document discloses a metering apparatus comprising a metering head having diametrically opposite input and output passageways separated by a cylindrical chamber. In the cylindrical chamber is a rotating disk having a passageway that passes diametrically through it and a piston sliding within the disk passageway so that it is simultaneously disbursing and filled with product when it is in alignment with the input and output passageways and then rotated 180°. However, these known systems are rather slow, they do not offer dosing versatility and they cause cavitation problems due to the backstroke of the filler.

Considering the above-mentioned shortcomings of the existing metering and dispensing systems, improvements in such devices are needed.

SUMMARY OF THE INVENTION

The present invention provides a metering device for accurately metering and dispensing fluid and semi-fluidic products ranging from water to yogurts to thick sauces with or without food mass particulates such as spaghetti-O's or Bolognese-type spaghetti sauces.

The metering device of the present invention provides for increasing production and operating speeds of a food product production line that includes a filling or depositing stage of a fluid or semi-fluidic food product.

The present invention also discloses a metering device which can be used in multiple operating configurations without modification of its structure. Particularly, the metering device of the present invention is capable of dispensing one or two doses of a fluid or semi-fluidic product from a single source, or alternatively, of metering two different products from two different sources and dispensing them in a single outlet dose. The metering device of the invention can thus be chosen to dispense food product in different operating configurations depending upon the particular dosing needs.

The present invention can exert a positive pressure on the flow of product in order to prevent cavitation, especially when working with hot/warm food, as it is known that cavitation is usually at the origin of dosing accuracy problems. A further feature of the present invention is to provide a metering device which can work in conjunction with a food product supply assembly that is gentle with the food that is supplied to reduce damage on the food and increase the range of food able to be supplied therefrom.

These features are obtained in improved metering systems that have a rotating metering head with a slide piston mechanism therein. In particular, these systems utilize a device that includes an outer part and an inner metering part having a dosing chamber and a piston block slideably mounted therein. The housing outer part has three passageways, and the dosing chamber is configured, dimensioned, and positioned to alternately connect two of the three passageways of the outer part. The inner metering part is configured, dimensioned and positioned for rotation within the outer part. The outer housing part and the inner metering part are mounted concentrically with the inner metering part and the inner metering part has only one degree of liberty in rotation around a central axis of rotation.

One characteristic of the present invention lies in the particular configuration of the three passageways of the outer metering part. These passageways are arranged at an angular location of between 90° to less than 180° from each other around the periphery. The inner metering part is further designed so that the dosing chamber can connect alternately two of the three passageways in two different positions symmetrical to the axis of the third passageway, and this by consecutive alternate motion of the metering part in the clock and counterclockwise directions. For this purpose, the outer housing part and the inner metering part are mounted concentrically, with the inner metering having only one degree of liberty in rotation within the outer part.

Preferably, the passageways are arranged at a angular location of from 100° to 140° from each other and the chamber is arranged across the inner metering part so as to connect two of the three passageways of the outer part upon each alternate rotation. Also, the dosing chamber is preferably linear and arranged across the inner metering part so as to connect consecutively two of the three passageways of the outer metering part in two different positions that are symmetrical to each other with relation to the axis of the third passageway upon each alternate rotation of the inner metering part. Thus, every half-cycle of a complete operating cycle of the device results in the simultaneous filling and discharging of the same amount of a food product. The device can have has one inlet passageway and two outlet passageways or two inlet passageways and one outlet passageway, as desired.

A first advantage of such a configuration of the metering device of the invention is that doubling the capacity and operating speed of the device is possible as filling and dosing of product is achieved every half-cycle when it is only done once with the device of U.S. Pat. No. 5,456,298. Then, a further advantage of the metering device of the present invention is that the number of the passageways and arrangement of the passageways relative to one another provide a versatility of use of the device, i.e., that it can be used either in a 1:2 or 2:1 dosing configuration. In a 1:2 dosing configuration, a first passageway serves as a product inlet while the two others serves as two outlets for dosing product on two parallel production lines, and in a 2:1 dosing configuration two different products can be combined to make a third one and dose it through a single outlet.

A method for preparing a final food product is also disclosed. In this method, at least one fluid food product is directed to one of the devices according to the invention so that the fluid food product(s) can be accurately metered and dispensed therefrom to assist in preparing the final food product. When the device is provided with one inlet passageway and two outlet passageways, the fluid food product can be metered and dispensed onto two adjacent production lines. Alternatively, when the device is provided two inlet passageways and one outlet passageway, two fluid food products can be metered and dispensed simultaneously.

Additional features and advantages of the present invention are described in, and will be apparent from, the following Detailed Description of the Preferred Embodiments and the figures.

BRIEF DESCRIPTION OF THE FIGURES

The features and advantages of the present invention will be discussed in the further detailed description of the invention with reference to the accompanying drawings, wherein:

FIG. 2b is a perspective view of the metering head of FIG. 2a;

DETAILED DESCRIPTION OF THE INVENTION

The term "fluid food product" is used in its ordinary sense to cover essentially any liquid edible material. In preferred embodiments, this term is intended to encompass viscous liquids, such as spaghetti sauce, gravies, creams and the like. In addition, the term also contemplates additions to the fluid food products such as particles of meat, pasta, rice, etc. provided that these particles are carried by a liquid.

Figure 1:
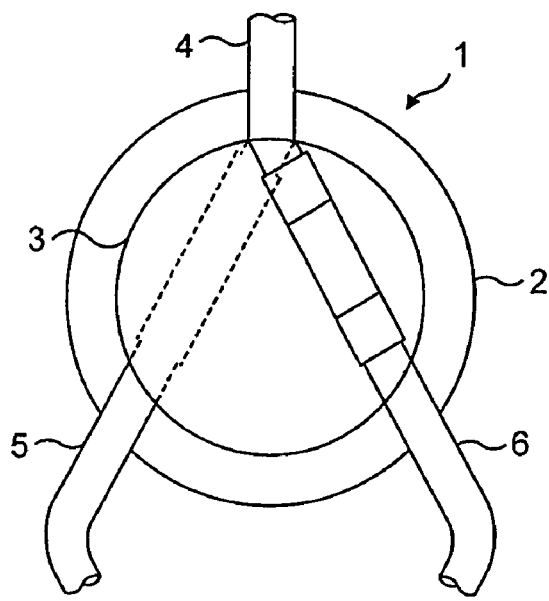
FIG. 1 is a cross-sectional view of the metering device of the invention, showing the inlets/outlets and a rotating metering head comprising a slide piston, a metering chamber bored in the head and containing the slide piston, and an outer cylindrical part encasing the metering head.

Referring first to FIG. 1, the metering device 1 of the present invention comprises a first cylindrical part forming a housing 2 for a second cylindrical part having a smaller diameter than the housing 2 and forming a metering head 3. The metering head 3 is coaxially mounted in the cylindrical housing 2 in a concentric manner such that it has only one degree of liberty in rotation around an axis X passing by the center of the circular faces of the housing 2 and the metering head 3. The housing 2 is further bored with three passageways situated at an angle of between 90 to less than 180 degrees from each other around its periphery for the purpose of connecting three tubes 4, 5, and 6 for feeding the metering device with product and respectively discharging depending on a chosen configuration of use of the device.

In one embodiment, the three passageways are separated by an angle of between about 100 to 140 degrees from each other, and more preferably of about 120 degrees as shown in FIG. 1. A main advantage of having three passageways situated at about 120° from each other is that it gives the metering device of the invention a versatility feature. Indeed, it can be used either in a 1 to 2 (or 1:2) dosing configuration, i.e., with one inlet 4 and two outlets 5 and 6 or in a 2 to 1 (or 2:1) dosing configuration, i.e. with two inlets 5 and 6, and one outlet 4. The dosing configuration can be obtained by merely reversing the dosing direction of the device and does not require any changing of the metering head. Therefore, in a 1:2 dosing configuration of a first embodiment of the invention shown in FIG. 11, two separate doses of a product can be dispensed onto parallel running lines without the use of manifolds whereas, in a 2:1 dosing configuration of a second embodiment shown in FIG. 12, two different products can be combined and dosed at a 50:50 rate with a great accuracy through the same outlet for dispensing into a common zone.

Figure 2:
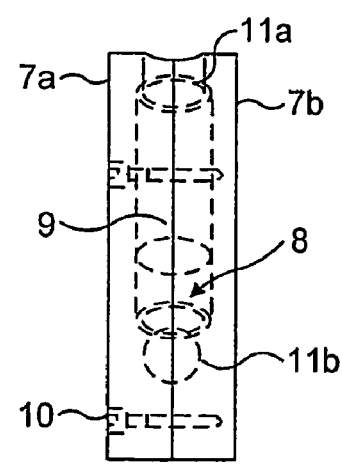
FIG. 2 is a cut away view of the metering head of the metering device of the invention.
Figure 2A:
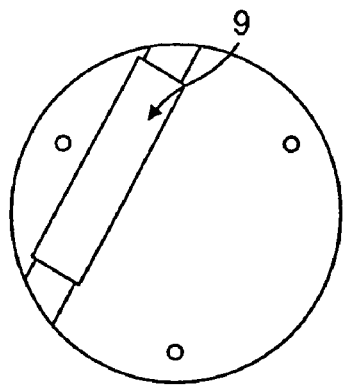
FIG. 2a is a side view of one half of the metering head with the slide block removed.
Figure 2B:
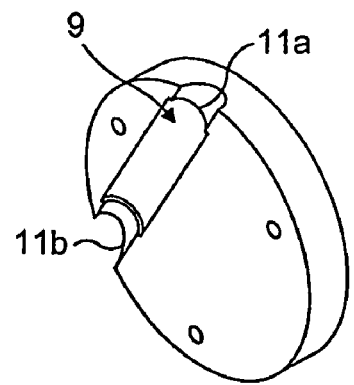

The metering head 3 is rotatable within the housing 2 and it can be made of two separate symmetrical halves 7a, 7b fastened to each other by means of detachable connection means such as screws 10, three of which are shown in FIG. 2. Inside, the metering head includes a slide piston mechanism which is composed of a slide block 8 capable of sliding along a dosing chamber 9 formed by identical and complementary portions scooped out in the two halves 7a, 7b of the metering head 3. The slide block 8 and the dosing chamber 9 preferably have a cylindrical design and, when the two halves 7a, 7b are connected together, the dosing chamber 9 extends within the metering head in a manner suitable for connecting consecutively two of the three passageways in the housing part 2 in two different positions, symmetrical to each other with relation to the axis Y of the third passageway upon rotation of the metering part 3. Moreover, to entrap the slide block 8 in the metering head 3, the diameter of the emerging ends 11a, 11b of the dosing chamber must be smaller than the diameter of the slide block 8 and the dosing chamber 9 themselves, so as to form indentations that retain the slide block 8 in the dosing chamber 9.

Referring now to FIGS. 3 to 10, a complete operating cycle will be described in details for a first working configuration of the metering device of the invention.

Figure 3:
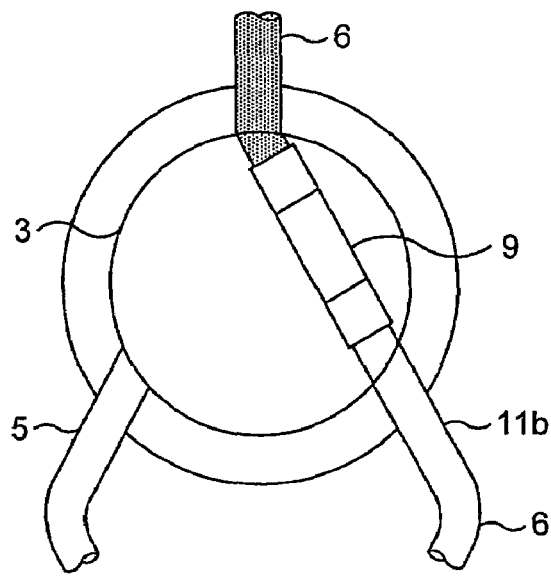
FIG. 3 is a cross-sectional view of the metering device showing the metering chamber completely discharged an the rotating metering head in a first filling position with a food product forced at the inlet of the device.
Figure 4:
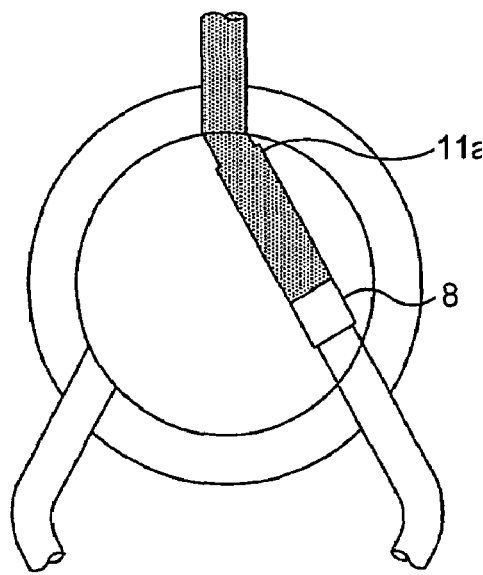
FIG. 4 is the same view as FIG. 3 but showing the piston slid to the opposite end of the metering chamber being now completely filled with food product.
Figure 5:
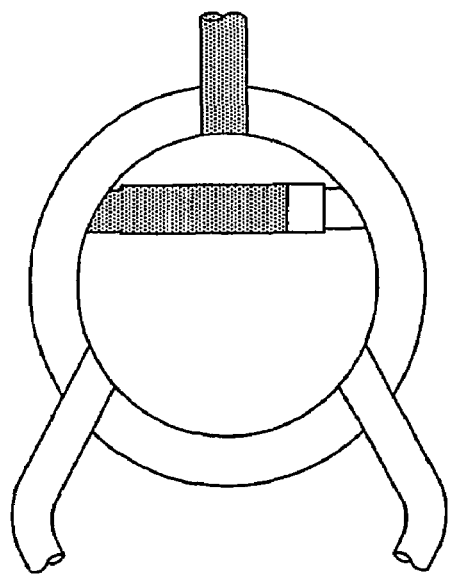
FIG. 5 is the same view as FIG. 4 but showing the metering head of the device rotated 120° counter clockwise to a second position.

As seen in FIG. 3 for a 1:2 dosing configuration of the metering device according to the invention, a fluid or semi-fluidic food product 12 is supplied under pressure at an inlet of the metering device 1 through an inlet tube 4 of the housing 2. The metering head 3 is in a first filling position, hereafter called position "A". The dosing chamber 9 is completely empty, the slide block 8 in an upward position and the emerging end 11a of the dosing chamber 9 communicates with the inlet tube 4 while the opposite emerging end 11b communicates with a first outlet tube 6 of the device. Under the pressure of the food product 12 the slide block 8 is pushed to the second emerging end 11b towards the dosing chamber 9, which is consequently filled with a first dose of food product as shown in FIG. 4. As the emerging ends 11a, 11b have a smaller diameter, the slide block is stopped in a backward position and kept under pressure of the food product when it reaches emerging end 11b of the dosing chamber 9, thus ensuring that an accurate amount of product has filled the cavity. The metering head 3 is then rotated about 120° counterclockwise, as it is represented in FIG. 5, to a second position symmetrical to position A and hereafter called position "B".

Figure 6:
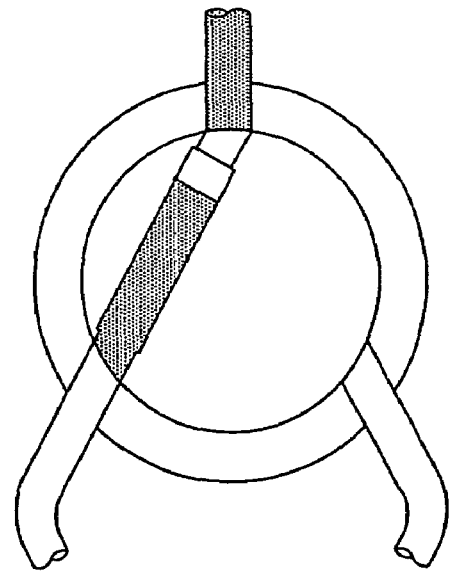
FIG. 6 is the same view as FIG. 5 but showing the metering head in a second position for discharging a first dose of food product through an outlet of the metering device and for refilling of the chamber.
Figure 7:
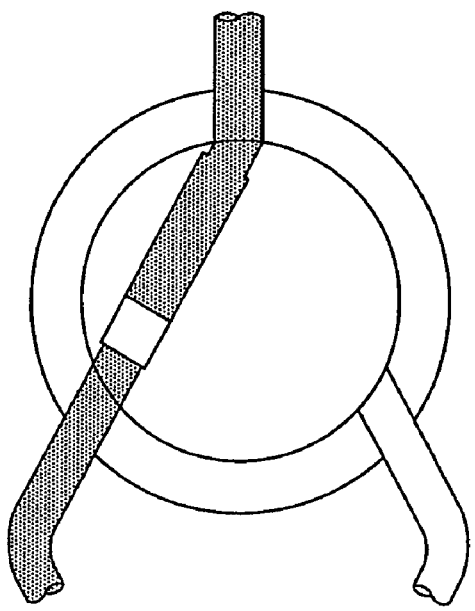
FIG. 7 is the same view as FIG. 6 but showing a second filling of the metering chamber and a simultaneous discharging of a same amount of food with the piston slid down.
Figure 8:
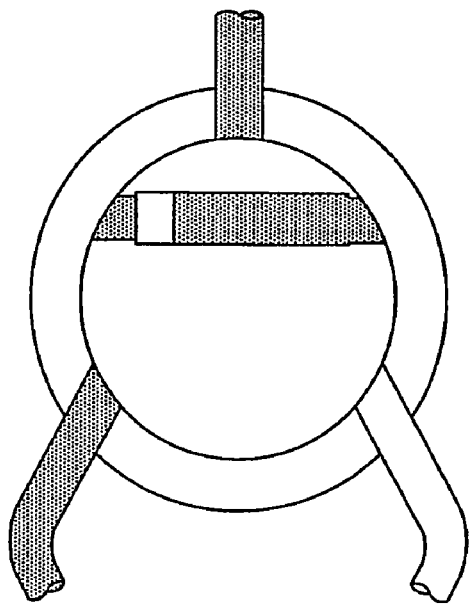
FIG. 8 is the same view as FIG. 7 except with the rotating metering head filled with product and being rotated 120° clockwise back to the first position.
Figure 9:
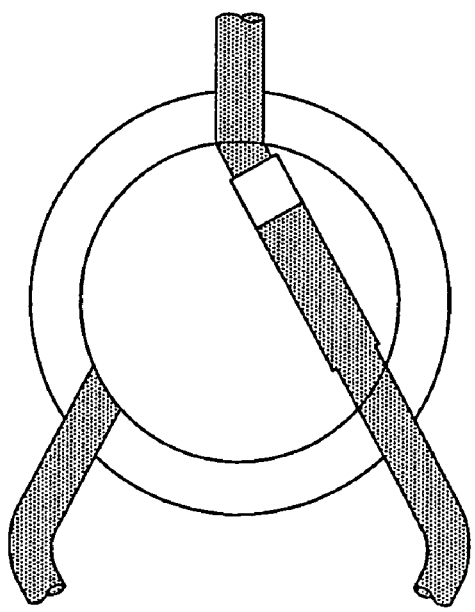
FIG. 9 shows the metering head back in the first position for discharging of a second dose of food product through a second outlet of the metering device and simultaneous recharging of the chamber.
Figure 10:
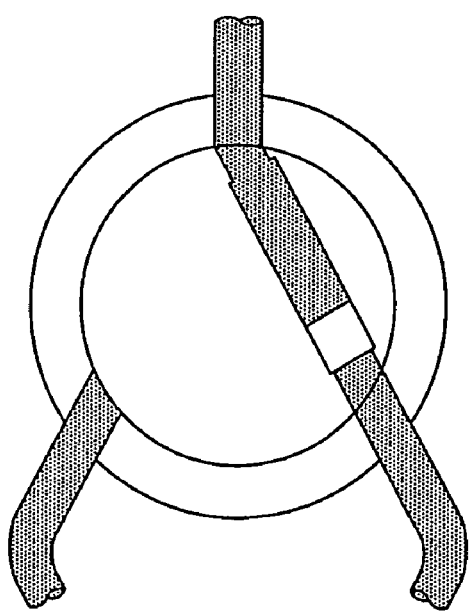
FIG. 10 is the same view as FIG. 9 but showing the metering head at the end of a working cycle of the metering device with the metering chamber refilled with product and a second dose of product discharged in a second outlet of the device.

As shown in FIG. 6, in position "B" the slide piston mechanism is inverted compared to position "A". The slide block 8 is again in an upward position but now the emerging end 11a is communicating with the second outlet tube 5 of the metering device while emerging end 11b communicates with the inlet tube 4 where the food product is continuously forced in. The dosing chamber 9 is subsequently filled a second time while at the same time the first dose of product filled in position "A" is disbursed through the outlet tube 5 under the action of the slide block 8 forced down by the product as shown in FIG. 7. Then, the metering head 3 is rotated 120° clockwise back to position "A" as shown in FIG. 8. Another simultaneous action of filling and discharging an equal amount of food product in and from the dosing chamber 9 occurs through the second outlet tube 6, completing one operating cycle of the metering device of the invention as shown in FIG. 9 and FIG. 10. It continues then to rotate back and forth, dosing and filling exactly a same amount of food product all in one motion every halves of a working cycle.

According to the above description of an operating cycle, a second main advantage of the present metering device over the conventional piston metering apparatuses is that it allows for doubling the operating speed and thus the production rate of the device as compared with the prior art. Indeed, with the device disclosed for example in U.S. Pat. No. 5,456,298, there are only one inlet and one outlet to the device, creating the need to rotate the metering head 180° backward and forward to fill and then disburse the product. Thus it takes one complete operating cycle to dispense a single dose. With the present metering device rotating the metering head of 120° allows to complete filling and discharging of the dosing chamber in a same motion every half-cycle of the system, therefore dosing twice in one full cycle whatever configuration of the device were, i.e. a 1:2 or a 2:1 dosing configuration.

It is thus possible to dispense at a speed of up to 120 doses of product per minute, which represents an operating speed of the device almost twice the speed of conventional piston metering devices actuated by pneumatics like the one of U.S. Pat. No. 5,456,298.

Turning again to FIG. 2, the volume of product to be dosed in the metering head 3 can easily be adjusted depending on the needs, by varying the length of the slide block 8 so that it takes more or less room in the dosing chamber 9. This can be done by simply removing the metering head 3 from the housing 2, unscrewing the three screws 10 fastening the two halves 7a, 7b of the metering head 3 together and changing the slide block 8 placed inside the metering head 3. Furthermore, all the elements constituting the metering device of the invention are preferably made of food grade materials, such as plastics and metals such as stainless steels, which materials can also be easily molded and processed at low costs.

Another advantage of the metering device of the invention over the prior art is that the operating speed and accuracy of the dosing unit are kept constant by maintaining a positive pressure on the flow of product at the inlet of the metering device. Indeed, a limiting factor with conventional piston metering device fed with pumps is that a cavitation phenomenon usually occurs due to the backstroke of the piston, particularly when working with warm/hot fluid or semi-fluidic products. Cavitation is a hydraulic condition, which can exist with any type of pump and which corresponds to the formation of gas or vapor cavities into a moving fluid when the pressure at one point of the fluid becomes lower to the vapor tension of that fluid.

Figure 11:
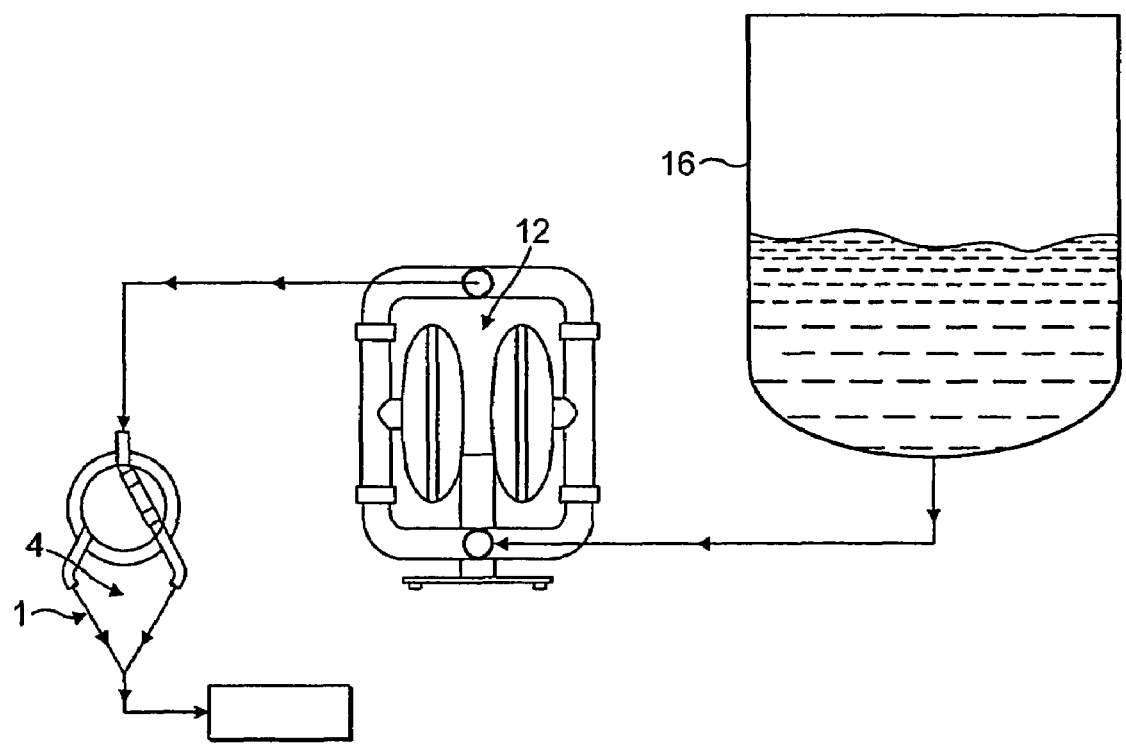
FIG. 11 shows a first preferred embodiment of the metering device of the invention coupled to one feeding pump in a one inlet and two outlets configuration.

In the metering device of the invention, any cavitation is prevented by using a double-diaphragm pump 12 for feeding the food product at the inlet 4 of the metering device 1 with a constant pressure as shown in FIG. 11, representing a first preferred embodiment of the invention with the metering device used in a 1:2 dosing configuration. Supplying product from a supply 16 with a constant pressure could be achieved with any type of positive displacement pumps like for instance rotary lobe pumps. However, and additional advantage of using a double-diaphragm pump 12 for supplying the metering device 1 of the invention is that the diaphragm construction prevents the product from being damaged. Particularly, in the case of processing semi-fluidic food product having food mass particulates therein, the use of a diaphragm pump gently handles the product whereas it would be crushed into rotary pumps. In stating this, the range of product processed and dosed with the metering device of the invention can vary from totally liquid products like water or milk to thicker fluids as well as sauces and gravies with large food particulates therein, such as, for example, spaghetti O's, meat sauces, rice pudding, and the like. Furthermore, by using a diaphragm pump to feed the metering device the output product pressure from the pump to the inlet of the metering device is directly proportional to the air pressure used to actuate the pump. Thus pressure from at least about one psi to about 120 psi can be applied at the inlet of the metering device depending on the viscosity and particulate mass of the product to be dosed.

Figure 12:
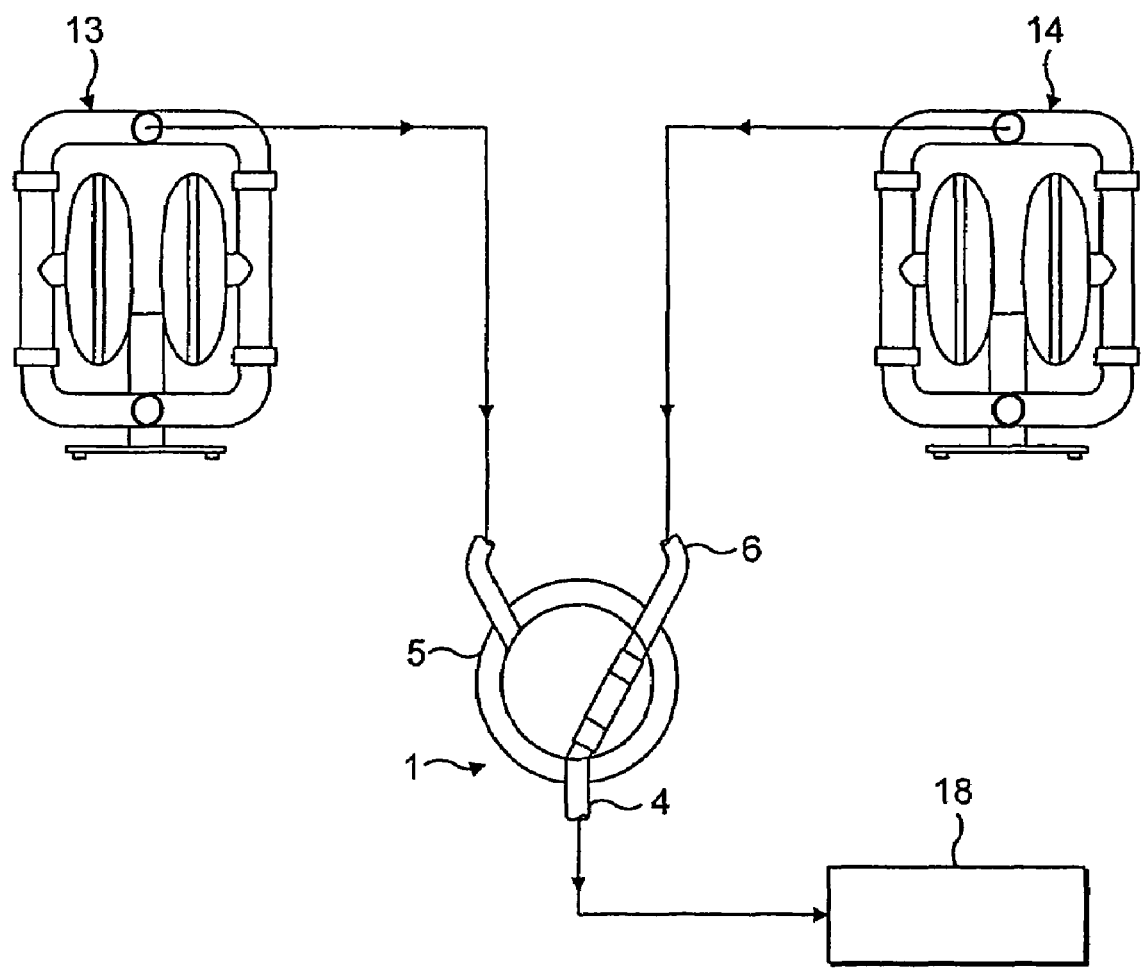
FIG. 12 shows a second preferred embodiment of the metering device of the invention coupled to two feeding pumps in a two inlets and one outlet configuration.

In the case the metering device is used in a 2:1 dosing configuration as shown in FIG. 12 for a second preferred embodiment of the invention, two separate diaphragm pumps 13 and 14 must be used to feed the products at each separate inlet 5 and 6 of the metering device 1. Thus an appropriate product pressure is applied at each inlet of the metering device to ensure the accuracy of the metering of each product independently depending on their physical characteristics for dispensing the product exactly at a 50/50 rate through the single outlet 4 of the metering device. The outlet 4 may be connected to a terminal dispensing head 18 that dispenses the product on a point of dispense such as a food tray travelling on a conveyor belt.

Coupled to the metering head of the device according to the present invention is also a trigger assembly for the purpose of driving the metering head of the metering device in rotation to actuate the metering device. The trigger assembly can conveniently be a pneumatic system including an air-actuated solenoid triggered by a sensor-controller. But if the metering device of the invention is to be used in a very enclosed environment, the metering head can also conveniently be electronically driven by means of a servo requiring a signal input from a sensor-controller. Alternately, when the metering is used in-line with a conveying system for metering and products directly into recipients, the metering head can also mechanically set in time with the product conveying system in order to control the metering action with respect to the advancement of the conveying system.

The metering device according to the present invention has been described in what is considered to be the most practical and preferred embodiments. However, it may be subject to many alternatives and modifications, which could become evident to the skilled artisan but without departing from the spirit and the scope of the invention claimed.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A device for accurately metering a product, the device comprising a housing outer part and an inner metering part having a dosing chamber and a piston block slideably mounted therein, the housing outer part comprising three passageways, wherein two of the passageways are arranged at an opposing angular location of from between 90 to less than 180 degrees from the remaining passageway and the dosing chamber is constructed and arranged so as to alternately connect the two opposing passageways of the outer part to the remaining passageway.

2. A device according to claim 1, wherein the inner metering part is configured, so constructed and arranged so as to rotate within the outer part.

3. A device according to claim 2, wherein the outer housing part and the inner metering part are mounted concentrically with the inner metering part and the inner metering part has only one degree of liberty in rotation around a central axis of rotation.

4. The device according to claim 1, wherein the passageways are arranged at an angular location of approximately 120 degrees from each other and the chamber is arranged across the inner metering part so as to connect two of the three passageways of the outer part upon each alternate rotation.

5. The device according to claim 1, wherein the dosing chamber is linear and arranged across the inner metering part so as to connect consecutively two of the three passageways of the outer metering part in two different positions that are symmetrical to each other with relation to the axis of the third passageway upon each alternate rotation of the inner metering part.

6. A device according to claim 1, wherein the dosing chamber includes emerging ends that form recesses to entrap the piston block in the inner metering part.

7. A device according to claim 1, having one inlet passageway and two outlet passageways.

8. A device according to claim 1, having two inlet passageways and one outlet passageway.

9. A method for preparing a final food product, the method comprising the steps of directing at least one fluid food product to a device comprising a housing outer part and an inner metering part having a dosing chamber and a piston block slideably mounted therein, the housing outer part comprising three passageways, and the dosing chamber being so constructed and arranged so as to alternately connect two of the three passageways of the outer part so as to accurately meter and dispense the fluid food product(s) therefrom to assist in preparing the final food product, wherein two of the passageways are arranged at an opposing angular location of from 100 to 140 degrees from the remaining passageway.

10. A device for accurately metering a product, the device comprising a housing outer part and an inner metering part having a dosing chamber and a piston block slideably mounted therein, the housing outer part comprising three passageways, and the dosing chamber being so constructed and arranged so as to alternately connect two of the three passageways of the outer part, wherein two of the passageways are arranged at an opposing angular location of from 100 to 140 degrees from the remaining passageway and wherein every half-cycle of a complete operating cycle of the device results in the simultaneous filling and discharging of the same amount of a food product.

11. A method for preparing a final food product, the method comprising the steps of directing at least one fluid food product to a device comprising a housing outer part and an inner metering part having a dosing chamber and a piston block slideably mounted therein, the housing outer part comprising three passageways, and the dosing chamber being so constructed and arranged so as to alternately connect two of the three passageways of the outer part so as to accurately meter and dispense the fluid food product(s) therefrom to assist in preparing the final food product, wherein two of the passageways are arranged at an opposing angular location of from 100 to 140 degrees from the remaining passageway and wherein the device has one inlet passageway and two outlet passageways so that the fluid food product can be metered and dispensed onto two adjacent production lines.

12. A method for preparing a final food product, the method comprising the steps of directing at least one fluid food product to a device comprising a housing outer part and an inner metering part having a dosing chamber and a piston block slideably mounted therein, the housing outer part comprising three passageways, and the dosing chamber being so constructed and arranged so as to alternately connect two of the three passageways of the outer part so as to accurately meter and dispense the fluid food product(s) therefrom to assist in preparing the final food product, wherein two of the passageways are arranged at an opposing angular location of from 100 to 140 degrees from the remaining passageway and wherein the device has two inlet passageways and one outlet passageway so that two fluid food products can be metered and dispensed simultaneously.

13. A method for preparing a final food product, the method comprising the steps of directing at least one fluid food product to a device comprising a housing outer part and an inner metering part having a dosing chamber and a piston block slideably mounted therein, the housing outer part comprising three passageways, and the dosing chamber being so constructed and arranged so as to alternately connect two of the three passageways of the outer part so as to accurately meter and dispense the fluid food product(s) therefrom to assist in preparing the final food product, wherein two of the passageways are arranged at an opposing angular location of from 100 to 140 degrees from the remaining passageway and wherein the inner metering part is so constructed and arranged to allow for rotation within the outer part to meter and dispense the fluid food product.

* * * * *